United States Patent
Newcombe et al.

(10) Patent No.: US 6,324,576 B1
(45) Date of Patent: Nov. 27, 2001

(54) MANAGEMENT INTERWORKING UNIT AND A METHOD FOR PRODUCING SUCH A UNIT

(75) Inventors: Adrian Newcombe, County Dublin; Damian McGrath, County Meath, both of (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/125,252

(22) PCT Filed: Feb. 14, 1997

(86) PCT No.: PCT/IE97/00010
§ 371 Date: Dec. 10, 1998
§ 102(e) Date: Dec. 10, 1998

(87) PCT Pub. No.: WO97/30535
PCT Pub. Date: Aug. 21, 1997

(30) Foreign Application Priority Data

Feb. 15, 1996 (IE) .................................................... S960137

(51) Int. Cl.[7] .................................................. G06F 15/173
(52) U.S. Cl. .......................... 709/223; 709/224; 709/226; 709/217; 709/230; 709/310; 707/103; 707/203; 717/5
(58) Field of Search ................................. 709/223, 224, 709/303, 226, 217, 230, 310; 707/103, 201, 203; 703/22; 717/5, 7, 8

(56) References Cited

U.S. PATENT DOCUMENTS

| 5,291,583 | * | 3/1994 | Bapat | 707/103 |
|---|---|---|---|---|
| 5,471,617 | * | 11/1995 | Farrand et al. | 709/100 |
| 5,491,822 | * | 2/1996 | Allen et al. | 709/303 |
| 5,519,868 | * | 5/1996 | Allen et al. | 395/705 |
| 5,608,720 | * | 3/1997 | Biegel et al. | 370/249 |
| 5,651,006 | * | 7/1997 | Fujino et al. | 709/223 |
| 5,764,955 | * | 6/1998 | Doolan | 709/223 |
| 5,802,146 | * | 9/1998 | Dulman | 379/120 |
| 5,845,080 | * | 12/1998 | Hamada et al. | 709/224 |
| 5,864,862 | * | 1/1999 | Kriens et al. | 707/103 |
| 5,903,731 | * | 5/1999 | Vincent et al. | 709/226 |
| 6,055,243 | * | 4/2000 | Vincent et al. | 709/223 |

FOREIGN PATENT DOCUMENTS

| 94/06232 | * | 6/1994 | (EP) . |
|---|---|---|---|
| WO 94/23514 | | 10/1994 | (WO) . |
| WO 95/23469 | | 8/1995 | (WO) . |
| WO 97/05703 | | 2/1997 | (WO) . |

OTHER PUBLICATIONS

"Management of Virtual Private Networks for Integrated Broadband Communications", Schneider et al., SIG-COMM'93, 1993 ACM.*

T. Leskinen, "GSM Subscriber Management on Top of a Generic TMN Agent," *PIMRC*, IEEE International Symposium on Personal Indoor & Mobile Radio Communications, vol. 3, pp. 1004–1008, Sep. 1994.

M. Jander, "SNMP Management Unbound," *Data Communications*, vol. 2, No. 2, pp. 125, 126, 128, Feb. 1992.

* cited by examiner

Primary Examiner—Kevin J. Teska
Assistant Examiner—William Thomson
(74) Attorney, Agent, or Firm—Burns, Doane, Swecker & Mathis, L.L.P.

(57) ABSTRACT

In a process a management information unit (MI) is produced by creating models of the management interface to be interworked. Each model has objects representing managed resources. Domain knowledge, an interface and a processor create mappings between equivalent parts of the models. The models and mappings from an information conversion function (ICF) which communicates using an internal protocol with a pair of message communication functions. The message communication functions perform format conversions and communicate with the interworked interfaces.

40 Claims, 4 Drawing Sheets

MANAGEMENT INTERWORKING UNIT AND A METHOD FOR PRODUCING SUCH A UNIT

The invention relates to a management interworking unit (MIU) and to a method for producing such a unit. The invention relates particularly, but not exclusively, to interworking of telecommunication systems.

There are numerous situations where a management interworking unit is required to allow management systems to interoperate. In one typical example, one management system is a PABX supporting a proprietary management interface and the other is a remote manager which supports a standardised interface. The MIU will provide conversion of protocol and information allowing the remote manager to control the PABX.

MIUs typically have a conversion function often referred to as an information conversion function (ICF), and interfaces often referred to as message communication functions (MCFs). An example of an MIU is that described in PCT patent specification No. WO95/23469 (British Telecommunications PLC). The ICF includes a mapper 44 and the MCFs includes stacks 40 and 52. While such MIUs are generally quite effective, they are often difficult to produce because there is a large degree of manual input, and they are difficult to modify or expand.

SUMMARY OF THE INVENTION

The invention is directed towards providing an improved management interworking unit which has a simpler construction.

Another object is to provide a method for producing a management interworking unit which is more efficient than has heretofore been the case.

According to the invention, there is provided a process for producing a management interworking unit for a pair of management interfaces comprising the steps of:
  producing an information conversion function (ICF) by:
    storing a model associated with each interface, each model comprising objects representing managed resources, and
    creating mappings including run time conversion functions between equivalent parts of the models; and
  producing a message communication function (MCF) associated with each management interface, each MCF comprising means for performing format conversion between the external protocol of the associated interfaces and an internal protocol for the ICF.

By creating models and subsequently creating mappings between equivalent parts of the models the production of the ICF may be automated to a large extent. This considerably reduces the lead time in producing an MIU. Further, by separating out format conversion as an operation which is performed exclusively by the MCF, the task of producing the MIU is broken down in a simple manner. All internal communication uses the internal protocol and the MCFs solely carry out the format conversion which is required for communication with the interworked management interfaces.

In one embodiment, each model comprises objects in a containment hierarchy providing a containment context for each object. In this way, the managed resources are represented in a simple manner which reflects their structure.

Preferably, each object has a class defined by characteristics independently of the context. It has been found that by linking the class and the context, a very effective way has been found for automatically identifying equivalent parts of the two models. This allows a large degree of automation.

Preferably, the models are created at least partially automatically by loader modules. The processing operations of loader modules may be carried out very efficiently.

In one embodiment, the models are created for management interface specifications, and specification free text is manually converted to the model language. This helps to ensure that any ambiguities which may exist in the specifications are not transferred to the models.

Preferably, the mappings are between individual objects and between groups of objects having the same class and context, namely context classes. This provides a very comprehensive set of mappings.

Preferably, the mappings define context class cardinality.

In one embodiment, the mappings are created between context classes, and preferably also between objects, and preferably also between object characteristics.

In one embodiment, the characteristics include object functions (or actions), relationships, attributes, notifications, and behaviour. It has been found that this set of characteristics comprehensively characterise each object.

Preferably, the mappings are created interactively using a graphical interface representing the models and the mappings. This is a very simple and fast way of creating the mappings.

Ideally, the mappings are predicated by run time rules selected for the mappings.

In one embodiment, the process has the further step of pre-compiling the models and the mappings to a template to produce source code.

Ideally, the template is manually modified after precompiling and flags are inserted in the template to differentiate automatically generated coded from manually generated code.

In one embodiment, searches are carried out to determine if a proposed mapping has previously been made for similar characteristics and such mappings may be re-used.

According to another aspect, the invention provides a management interworking unit (MIU) for at least two management interfaces comprising:
  an information conversion function (ICF) comprising:
    a model associated with each interface, each model comprising objects representing managed resources, and
    run time conversion mappings between equivalent parts of the models; and
  a message communication function (MCF) associated with each management interface, each MCF comprising means for performing format conversion between the external protocol of the associated interface and an internal protocol of the ICF.

This structure of MI stimulates the re-use of individual MCF/ICF components.

Preferably, each model comprises objects in a containment hierarchy providing a containment context for each object.

In one embodiment, each object has a class defined by characteristics independently of the context.

Preferably, the mappings are between individual objects and between groups of objects having the same class and context, namely context classes.

In one embodiment, the mappings define context class cardinality.

Ideally, mappings link context classes, and preferably also link objects, and preferably also link object characteristics.

In one embodiment, the object characteristics include object functions or actions, relationships, attributes, notifications, and behaviour.

In some cases, mappings are predicated by run time rules selected for the mappings.

In one embodiment the internal protocol includes primitives controlling start, end, and rollback of atomic transactions in the ICF.

BRIEF DESCRIPTION OF THE DRAWINGS

The invention will be more clearly understood from the following description of some embodiments thereof, given by way of example only with reference to the accompanying drawings in which.

DETAILED DESCRIPTION

Figure 1:
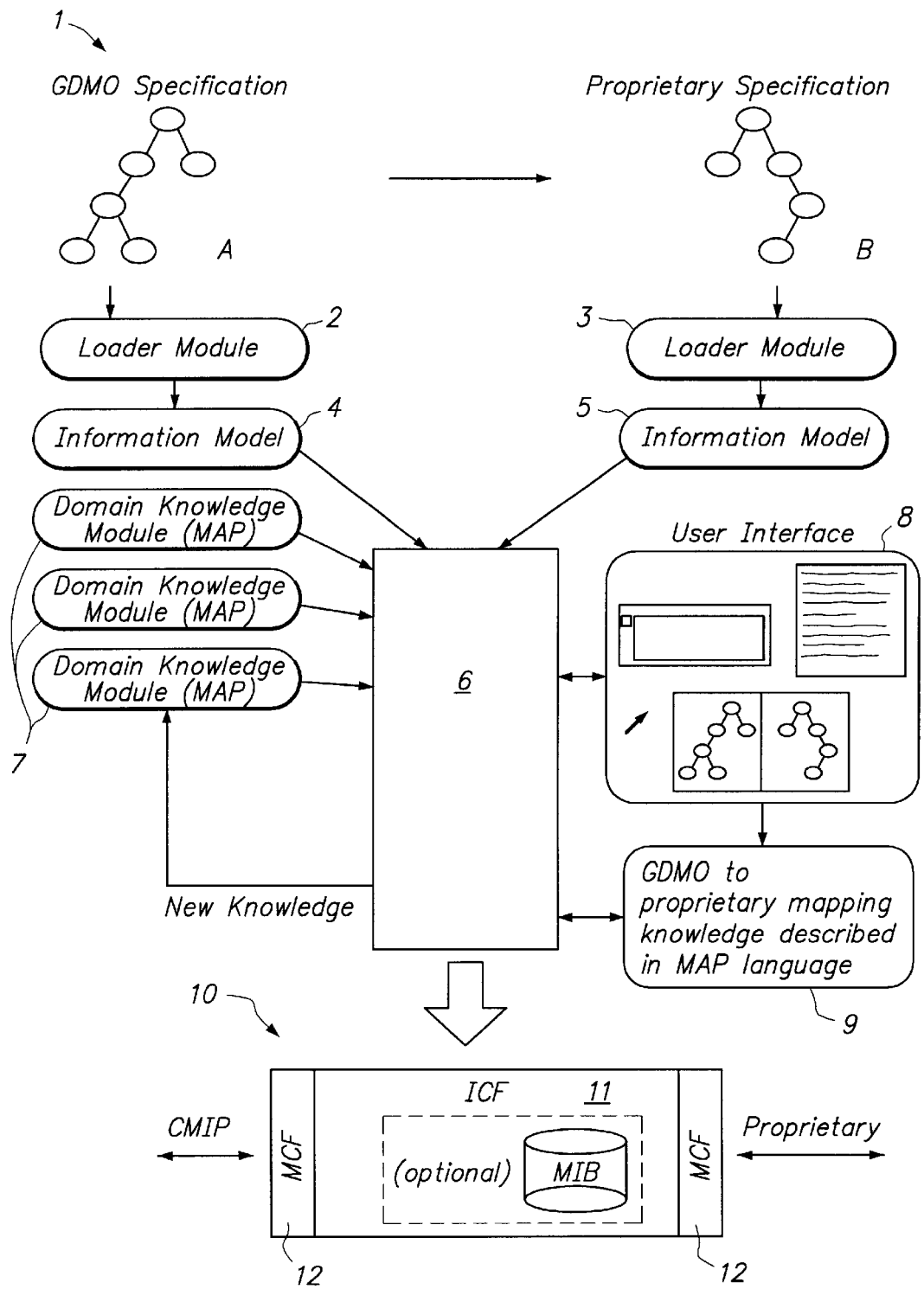
FIG. 1 is flow chart illustrating a process of the invention for producing a management interworking unit (MIU)

Referring to FIG. 1, a process 1 is illustrated for the production of a management interworking unit (MIU) 10. Very briefly, the process 1 involves taking source interface specifications A and B of the management system interfaces to be interworked. In this embodiment, the specification A is of a GDMO (General Description of Managed Objects) interface, whereas the specification B is of a proprietary interface. The specification A is converted to an information model 4 in a Map language representation by loader modules 2. The specification B is converted to an information model 5 defined in the Map langauge by loader modules 3 which parse the specification and convert it to the semantically equivalent Map language representation.

Instead of creating the models, they may be previously created as part of the specification or otherwise, and thus simply stored.

Once the models 4 and 5 in the Map language have been created, a processor 6 operates to generate the MIU 10. The processor 6 uses stored sets of domain knowledge 7 and inputs from a user interface 8 which are used to create mappings 9 during the process.

The MIU 10 comprises an information conversion function (ICF) 11 and a pair of message communication functions (MCFS) 12. The ICF 11 maps the information contained in one of the models 4 and 5 to that contained in the other to perform run time conversion. There is at least one ICF 11 for each pair of interworked models. The MCFs 12 handle all communication with the external entities. The external communication is according to the relevant protocol, such as CMIS (Common Management Information Services) or MML (Man Machine Language) primitives. There is a defined interface between each MCF 12 and the ICF 11, across which signals are transmitted according to an internal protocol. The internal protocol includes only ten basic primitives.

Within the architecture of the MIU 10, there is separation of core and optional functionality, functional distribution of the physical architecture, administration, and initialisation operations.

Returning to the process 1, in one example specification A is of a Q3 interface based upon an ETSI (European Telecommunications Standards Institute) standard management model for ATM cross-connects. Specification B is of a proprietary interface. Specification A is described in GDMO and accessed via the CMIP protocol through which the operations can be performed upon the managed objects. Specification B is based on a proprietary object oriented information model and communicates using a UNIX message queue.

There is a common internal representation for objects of the information models 4 and 5. The information in each interface is represented as a set of objects in a containment hierarchy. These objects are defined in a language developed for the purpose and called Map which describes not only the information models 4 and 5, but also the mappings 9 defining the relationships which exist between them. The loader modules 2 and 3 operate on the specifications A and B, which are typically stored as ASCII text to convert them into the Map description models 4 and 5. The descriptions which are generated may be annotated interactively using the interface 8 to generate additional Map statements. Alternatively, the user can directly generate the entire models 4 and 5 manually using Map. Parts of the specification written in free text may not be converted automatically by the loader module and so the user must annotate the model. This ensures that any ambiguities arising from free text are not passed into the model. An example is free text representation of managed object behaviours in GDMO specifications.

The manner in which the processor 6 creates the mappings 9 is now described. These mappings include creation relationships which twin entities in the two models. Such mappings between the two models link:

(a) context classes, and within these:

(b) objects; and within these:

(c) object internal characteristics.

Regarding (a) above, each class is defined by a set of characteristics including:

function (action), relationships, attributes (data members), notifications, and behaviour.

A context class is a particular class in a particular context or position in the containment hierarchy.

Regarding (b) above, each object represents a resource managed by the associated management system interface. They can be at widely different levels of the abstraction, depending on the nature of the management required. One level of abstraction is cross-connect equipment, and a lower-level example is a switching fabric contained within the cross-connect equipment.

Regarding (c) above each object is an instance of a class, i.e. it will have particular characteristic values.

The Map language can describe relationships which specify that when an instance of one context class is created in one model, then an equivalent instance of another context class should be created in the other model. These two instances are said to be twinned and the relationships are referred to as creation relationships. The processor 6 creates code to support run time mappings between the instances stored in the MIU and instances stored in one of the systems being interworked.

Figure 2:
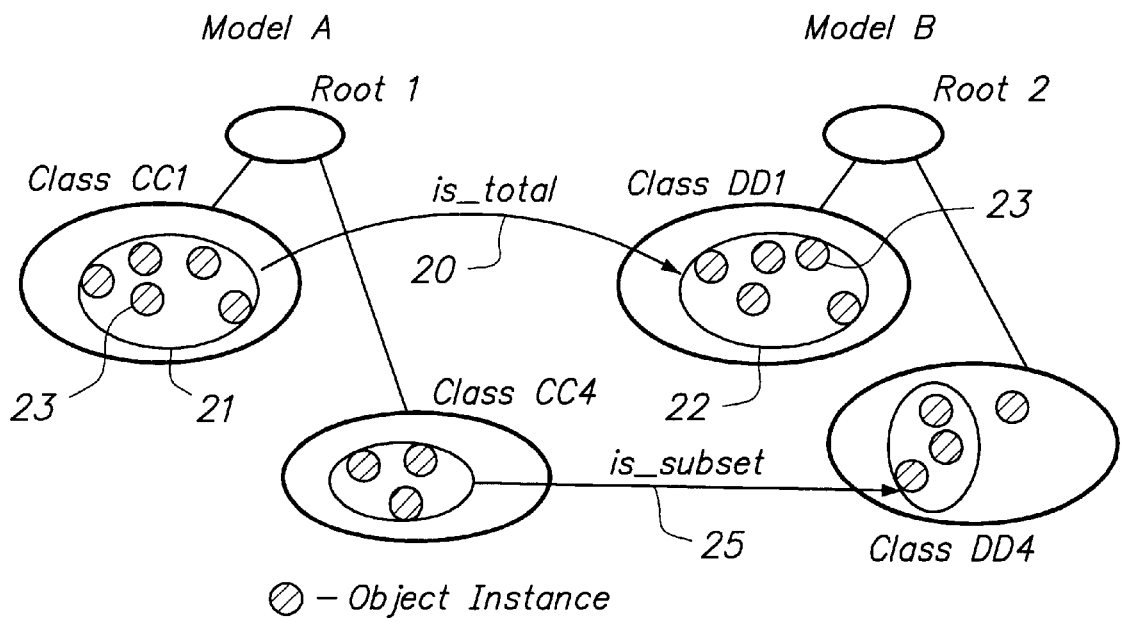
FIG. 2 is a schematic representation of relationships between entities of interworked interfaces.

Referring to FIG. 2, examples of the creation relationships are illustrated. One such relationship is referred to as a total relationship 20 between a context class 21 and a context class 22, each having objects 23. Such a relationship is one-to-one. Another type of creation relationship is a sub-set relationship 25 in which every instance created in A will lead to a twin creation in B, but not necessarily the reverse. Thus, the mappings include assertions defining cardinality.

Regarding the mapping of context classes, the Map language supports a simple set of assertions which are used to relate context classes in two models. These are described as follows:

1. Simple total relationship. Given a context class A in one model and context class B in another, they can be related using the expression (is-total A B). This means that whenever an instance of A is created, an instance of B must be created and vice versa. These instances are said to be twinned. This means that whenever an operation like get, set or action is performed on one, its equivalent must be performed on the other.
2. Subset and predicated relationships. The expression is_subset A B means that if an instance of A is created then an instance of B must also be created but the reverse is not necessarily true, i.e. if an instance of B is created then an instance A is not necessarily created. Determining when to create a twin can be done using predicates. These can be used, for instance, to test the values of attributes in a newly created instance of B to determine whether a twin instance of A should be created.
3. Relating attributes or subparts of attributes. Sometimes classes in two models may be related via an attribute which is a list or a set i.e. a twin instance exists for each member of the list or set.
4. Implicit relationships. These relationships do not imply twinning between two classes. Sometimes, however, an attribute in one model may be used to uniquely identify an instance of a class within another model. This is termed an implicit relationship and is supported in Map with the is_imp assertion.
5. Relating virtual base classes. Allowing inheritance of mappings reduces work in the same way that allowing inheritance in classes does.
6. Many-to-one creation assertions. These occur when two or more classes in one model are to be related to the same class in another model.
7. Mappings to functional systems. Many legacy systems use functional interfaces such as 'C' language APIs or MMLs. The Map language specifies interface functions and asynchronous messages for handling these types of functional interface.

Regarding the mapping of objects and their characteristics, this involves describing the ways in which managed resources represented by the objects relate to each other. This relationship is represented by the mapping of the contained characteristics of the objects. The following are data-mapping cases involving primitives which accompany the class mappings is_total and is_subset:

1. Mapping simple attributes. This involves describing data mappings between two attributes of simple type (e.g. enumerated or integer). These mappings will generally take the form of tables for mapping enumerated types and functions for mapping other types such as integers.
2. Mapping complex attributes. Complex attributes are those involving structures, choices, lists or other combinations of the above. The notation for mapping these types is more involved.
3. Compound attribute mappings. This is where several attributes map to one attribute.
4. Mapping actions. Actions in one class may be mapped to one or more actions in a related class. Mapping actions involve two stages. The first stage is to map the action's parameters and return values. This is done in the same way that attributes are mapped. The second stage in mapping actions is to map the critical elements of their behaviours involving gets, sets, creates and actions. This is a complex task.
5. Non-existent mappings for mandatory attributes. This situation occurs when an attribute is required at object creation time but none exists because there is no equivalent information in the interworked interface. A default value is specified instead.
6. Uncacheable objects. This handles the situation of mapping notifications and what happens when an object can change but does not issue a notification to the MIU. Such objects are marked as uncacheable in the MIU.

The Map language consists of a list of declarations which describe the models 4 and 5 and the mappings 9. Map describes managed interfaces using managed object classes, data type definitions, functions, exceptions, messages, and a containment tree.

To choose an example, a typical datatype is described as follows:

(deftype drink_machine_state (enum empty not_empty full)) This is an enumerated type declaration for the type drink_machine_state which can have one of three values: empty, not_empty or full. Structures are declared in a similar fashion as are choices and lists. In addition, there are certain basic types such as integer, natural, string, real, boolean and reference (for referencing other managed objects).

Figure 3:
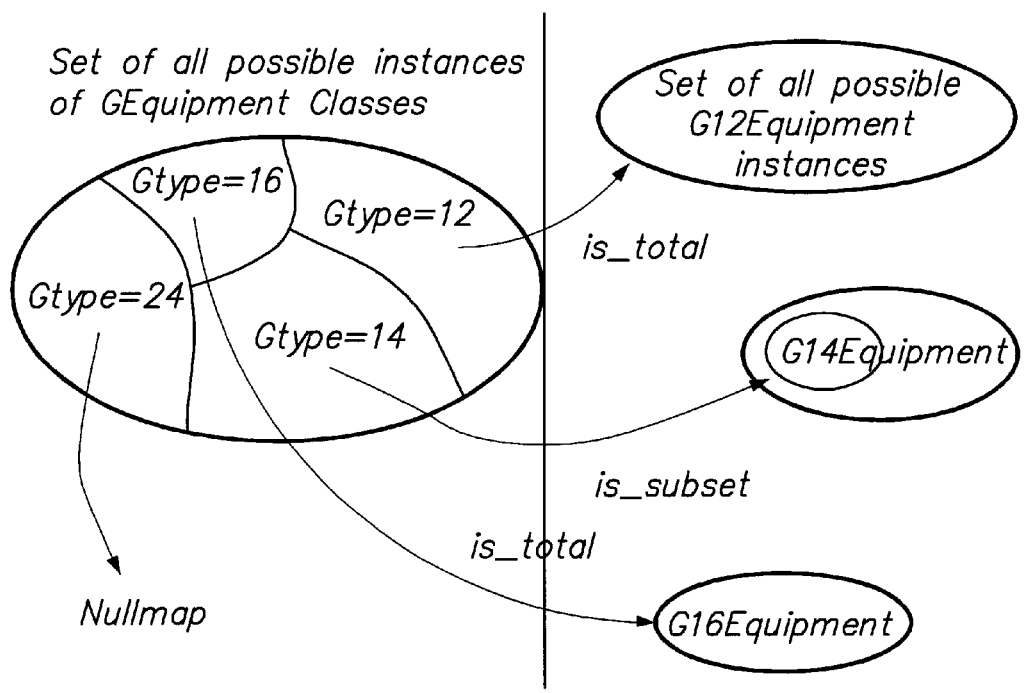
FIG. 3 is a schematic representation of a manner in which entities are mapped.

The following is an example of a mapping in the Map language. This-mapping relates to the diagram of FIG. 3.

(is_total GEquipment G12Equipment (=GType 12) . . . )

In this example, two models have taken a different approach to modelling the same real-world resources. One has chosen to model the set of all GEquipment objects using a single class called GEquipment. The other model has modelled the same type of resources using three different classes: G12Equipment, G14Equipment and G16Equipment which are less general than GEquipment. GType is an attribute in GEquipment. When, for example, an instance of GEquipment is created with GType=12, its twin will be an instance of G12Equipment class.

When GType=24, there is no equivalent mapping. The default decision for a predicated mapping is not to create a twin. The attributes which may be tested are those that must be supplied at creation time, i.e. mandatory attributes.

The general format of an is_total relationship is as follows:

```
(is_total source-context-class target-context-class
  predicate
  (attribute-maps . . . )      ;; Data mappings attributes
  (action-maps . . . )          ;; Mappings for attributes
  (notification-maps . . .))    ;; Mappings for notifications
```

The attribute-maps statement consists of a list of maps statements which have the general form for simple attribute mappings:

(maps <attribute-component> <attribute-component>

(down <maptable>|<function>)
(up <maptable>|<function>))

There are two mappings, one in a downward direction, one in an upward direction. These can be described by means of either a maptable which provides explicit translations for enumerated types or by a function which is written programmatically, like an action behaviour, or drawn from a standard set of functions, e.g. per-hour-to-per-minute. These predefined functions could potentially be provided in a library of separate Map modules. The simplest form of the maps statement is where two attributes are involved, both of which are enumerated types and maptables are used to specify downward and upward mappings. An example of this is illustrated below.

This example involves mapping simple attributes such as enumerated types or integers. Consider the following types used to describe the attributes drink_machine_state and vending_machine_state:

(deftype drink_machine_state_type (enum run_out ok low)) (deftype vending_machine_state_type (enum empty operational))

In order to map an attribute of type drink_machine_state_type to an attribute of type vending_machine_state_type, we use the following expression.

```
(attribute-mappings
  (maps drink_machine_state vending_machine_state
    ;; Mapping drink_machine_state down to
    ;; vending_machine_state
    (down
    (maptable
      (run_out empty)      ;; run_out maps to empty
      (ok operational)
      (low operational)
    ;; Mapping vending_machine_state back up to
    ;; drink_machine_state
    (up
    (maptable
      (empty run_out)      ;; empty maps to run_out
      (operational ok)
    ))
  ))
```

Mapping tables are not always sufficient for describing a mapping. Where more flexibility is required, mapping functions use the same simple programmatic syntax for describing conversions. Consider the problem of mapping from an integer attribute X to an integer attribute Y, The value of Y is always double that of X unless X exceeds 128, in which case Y always takes the value 256. In Map this would be implemented as.

```
(maps X Y
  (down
    ;; Declare a function with a single parameter
    ;; param will automatically be instantiated with
    (func (param)
      (var integer ?rval)
      ;;
      ;; Multiply param (X) by 2 and
      ;; assign to variable ?rval
      ;;
      (assign ?rval (* param 2))
      ;;
      ;; if ?rval exceeds 256 then
      ;; let ?rval = 256
      ;;
      (if (> ?rval 256)
```

```
        (assign ?rval 256)
        nil                  ;; else
      )
      ;;
      ;; Return the final result, ?rval
      ;;
      (return ?rval)
    )
    (up ;;; function to do the opposite of the downward
        function)
)
```

It is possible to use predefined or previously defined functions for mapping. For instance, if the values of attribute X mapped straight to attribute Y and vice versa the mapping could be defined as:

(maps X Y
  (down
    (function identity))
  (up
    (function identity)))

The compiler ensures that the number of arguments for the predefined function match those of the mapping (in this case a single argument is required in each direction).

The processor 6 has a compiler which generates skeletal source code for the MIU 10. Code generation occurs in two stages, namely pre-compiling for generation of a code template, and conversion of the code template into a code output. The code template allows a user to view the automatically generated source code and to customise it by addition of hand-written code. Flags are used to differentiate between the two types of code so that user code is not over-written by the compiler. The compiler generates source code of a high level language such as C++ as well as IDL code. Mapping features implemented include processing of is_total and is_subset class mappings including aspects such as:

Implementing mapping predicates,

Mapping 'context classes',

Mapping of class creation,

Propagation of simple/choice/structured data mappings for attributes both to and from the Managing and Managing Systems, Propagation of actions including parameter and return value mapping, Mapping set-valued attributes and action parameters, Mapping of notifications raised by the Managed System.

Figure 4:
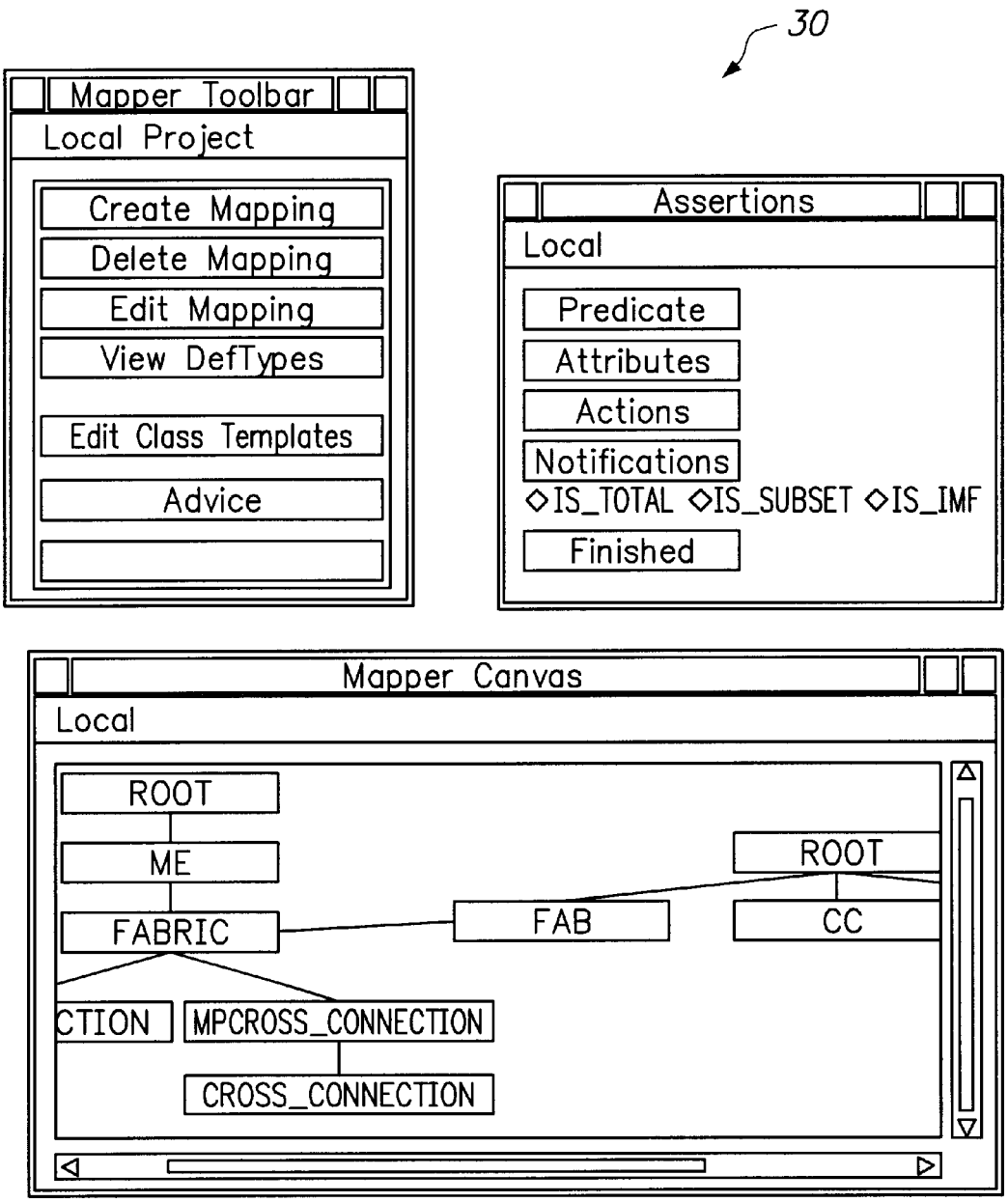
FIG. 4 is a sample display screen showing the manner in which the MIU is created.

In addition to a compiler, the processor 6 also uses the user interface 8 as a Map model editor and a mapping definition editor. Referring to FIG. 4, a tool bar 30 displayed by the user interface 8 is illustrated. This tool bar allows the user to select the source and target models to be mapped from the list of models loaded into the system. The screen shown in FIG. 4 is at the beginning of a mapping session in which a mapping has just been drawn between the class FABRIC in model A and the class FAB in model B. This is done simply by clicking on "Create Mapping" in the button and then selecting the source and target classes for the mapping. A line is then displayed to depict the mapping and the window shown top-right of the figure appears. This is referred to as an assertion window and it allows the user to specify the type and the content of the mapping. Normally the user will begin by specifying-the nature of the mapping at a class level and in this example it involves choosing a mapping as being is_total or is_subset. Other options could be available such as is_imp, is_total_rev, or is_subset_rev. The predicate, to describe the run time conditions under which the twinning is to be formed, must be specified. After hitting the predicate button they can type the predicate directly in an editor window. At any stage during modelling or mapping, the user may decide to compile the system down to source code using the menu illustrated.

In summary, the process carried out by the processor 6 could be set out briefly in the following table:

STEP 1 Describe the managed interfaces to the two systems being interworked. In general these descriptions will be generated automatically from the existing system specification. For instance, a file containing a GDMO description is imported using a converter which converts the specification to Map. If it is not possible to do this, then the user will have to describe the managed interface manually using the MIU CE's modeller toolbar.

STEP 2 Describe in the Map language the mappings between the two systems. Some of these will be specified by hand, others can be inferred automatically by the Creation Environment.

STEP 3 Compile the resultant Map description of the mappings down to code templates for the MIU. Code templates contain the outline of final MIU source code. They allow the user to see what this code output will look like. Code templates also allows the user to add their own handwritten code to supplement the autogenerated code (See step 4).

STEP 4 Add handwritten source code where necessary and generate final code output. Using code templates means that even if the mappings are recompiled the handwritten parts will not be overwritten.

Figure 5:
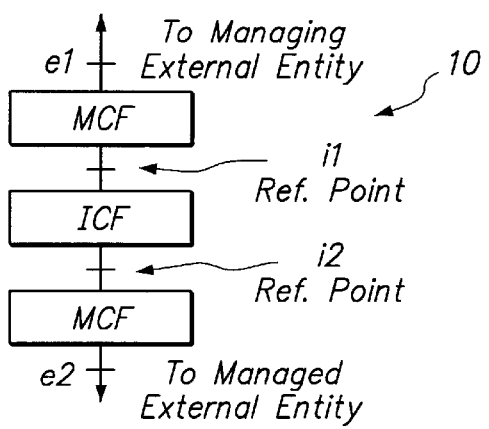
FIGS. 5 and 6 are is a schematic representations of the structure of an MIU.
Figure 6:
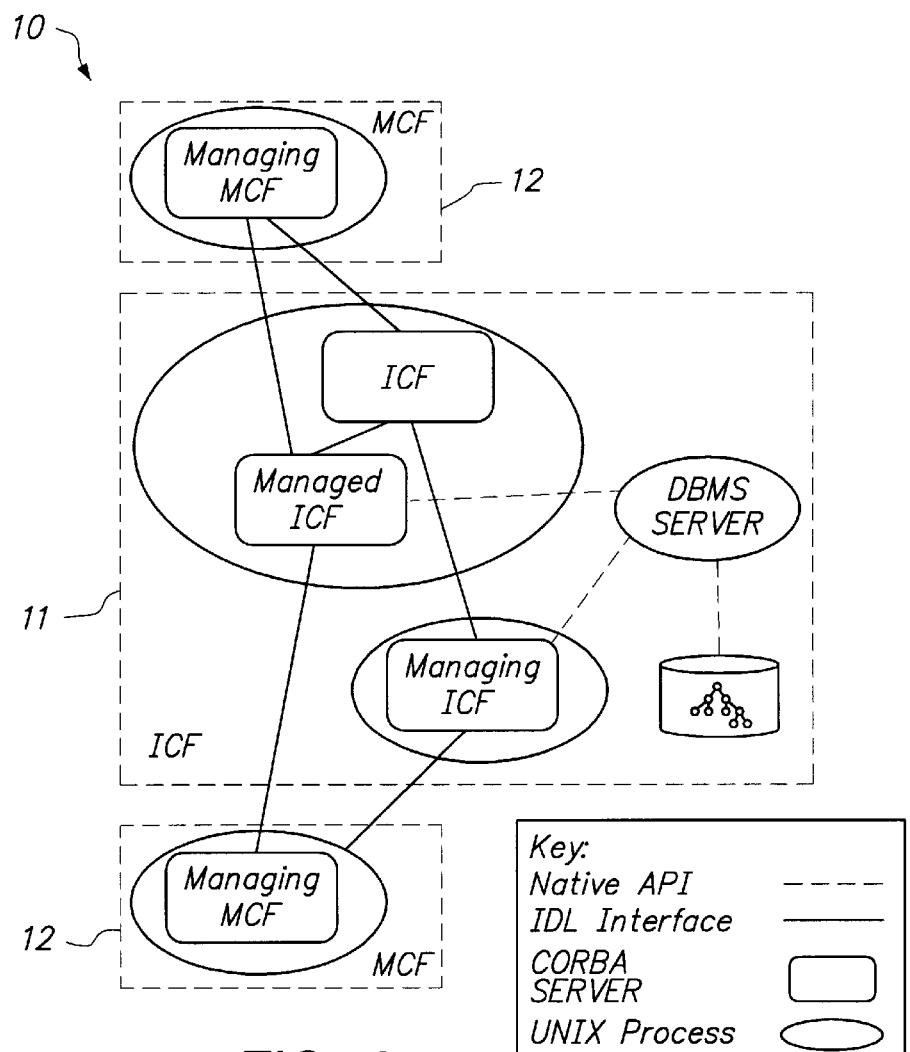

Referring to FIGS. 5 and 6, the MIU 10 which is created is shown in more detail. FIG. 5 shows the MIU broken into the MCFs and the ICF. The MCFs abstract the specifics of the particular communication protocols (e1 and e2). They use a homogeneous set of internal generic management primitives to communicate with the ICF over interfaces i1 and i2. The internal structure of the ICF which is used to effect the mappings between the systems at runtime is important. The purpose of the MIU CE (Creation Environment) is to provide support for a process to build the ICF portion of an MIU. The internal protocol which crosses the internal reference points 11 and 12 includes the following primitives:

| | |
|---|---|
| GET | Get is specific to object based models and retrieves the value of an attribute. It is analogous to the CMIS M-GET service element. |
| SET | Set is specific to object based models and sets the value of an attribute. It is analogous to the CMIS M-SET service element. |
| CREATE | Create is specific to object based models and creates a new object instance. It is analogous to the CMIS M-CREATE service element. |
| DELETE | Delete is specific to object based models and deletes an object instance. It is analogous to the CMIS M-DELETE service element. |
| FUNCTION | Function invokes a function across the interface. Such a function could be a CMIS M-ACTION or could be an MML command to a managed resource. Function can be synchronous in which it waits for the result of the function or asynchronous in which it doesn't wait. |
| NOTIFY | Notify intercepts an event report from the interface. Such an event report could correspond to a CMIS M-EVENT-REPORT or an asynchronous message from the managed resource. |
| RECEIVE | Receive enables the ICF to receive data from the interface. It would be used where the ICF expect's an asynchronous response from an external entity. The receive primitive blocks the ICF waiting for the response. |
| START-MIU-TRANSACTION | This primitive enables a set of primitives to be invoked as an atomic transaction. If an error occurs during one of the operations which make up the transaction then the previous operation can be undone to revert back to the previous state. |
| END_MIU_TRANSACTION | This primitive denotes the end of the transaction and indicates that the transaction was successful and should be committed. |
| ABORT_MIU_TRANSACTION | This primitive is used to terminate a transaction in which one of the operations was unsuccessful. It is used to rollback all the operations performed during the transaction and return the system to its previous state. |

RECEIVE
Receive enables the ICF to receive data from the interface. It would be used where the ICF expects an a synchronous response from an external entity. The receive primitive blocks the ICF waiting for the response.

START-MIU-TRANSACTION
This primitive enables a set of primitives to be invoked as an atomic transaction. If an error occurs during one of the operations which make up the transaction then the previous operation can be undone to revert back to the previous state.

END_MIU_TRANSACTION
This primitive denotes the end of the transaction and indicates that the transaction was successful and should be committed.

ABORT_MIU_TRANSACTION
This primitive is used to terminate a transaction in which one of the operations was unsuccessful. It is used to rollback all the operations performed during the transaction and return the system to its previous state.

The MCFs perform the format conversion to these primitives from the relevant external protocol by hard-coded rules.

The MIU provides the runtime support necessary for system interworking. In order to effect the mappings the MI architecture supports some particular runtime structures including:

A Twinning Table—Given a reference to an object in the MIU it will return a reference to the equivalent object in the managed systems and vice versa.

An expected events queue—This holds a list of events which are expected, when they are to arrive and what action to take when they arrive.

The Map compiler generates source code for these structures and all related mappings. Where required the MI can be generated so that it stores its objects persistently using a database. The key to the Map compiler is that it allows flexibility in the type of source code it outputs. The user can insert 'tags' in the map code allowing him or her to include portions of handwritten source code. This means that even if the mappings change the user's handwritten source code annotations will not be overwritten. Allowing flexible code generation is a great advantage. The invention does not require an expensive, proprietary runtime environment, because it can potentially generate code that will fit into a variety of runtime environments or else provide a 'light-weight' standalone runtime MIU.

The MCF and ICF components of the MIU 10 use CORBA IDL interfaces to communicate with other components. These interfaces are based on primitives for retrieving and setting values of attributes, creating and deleting object instances, invoking a function across the interface, event reporting, enabling the ICF to wait until specified data is received from the interface, enabling a set of primitives to be invoked as an automatic transaction, denoting the end of the transaction, and rolling back a transaction.

There may additionally be primitives for start-up. As can be seen from FIG. 3, each of the component objects contains at least one process and there is also a server process for the DBMS. Both the managed and managing ICFs are DBMS clients and manipulate the managed objects in the MIB, which is stored in the DBMS. Both the managing and the managed ICF servers act as distinct database clients and so are independent of each other.

Referring again to FIG. 6, the processes and IDL interfaces of the MIU 10 are illustrated. The ICF 11 acts as a dispatcher for the managed and the managing ICF interfaces. An MCF 12 is not allowed to associate directly with either the managed or managing ICF interfaces, but instead associates with the ICF interface, which then passes back a reference to the appropriate managed or managing ICF interfaces. This is done to ensure that the MCFs in an MIU are associated with the correct interfaces.

It will be appreciated that the invention provides a process for producing an MIU which automates the task to a large extent, while at the same time allowing large degree of user interaction to provide the necessary flexibility. The structure of the models and the manner in which the mappings are generated allows the degree of automation, and in addition provides a simple structure which may be easily understood by the user for manual annotation and later modification. Further, because the structure of the MIU is simple, it may be easily modified to either take account of changes in management interfaces which are already interworked, or to add additional interworking capability. The fact that the format conversion from the external to the internal protocol is performed by the MCFs separately from the ICF is an important feature as it results in a definite boundary between the MCFs and the ICF. Further, within the ICF, the model and mappings structure is relatively simple and allows easy modification.

The invention is not limited to the embodiments hereinbefore described, but may be varied in construction and detail.

What is claimed is:

1. A process for producing a management interworking unit for a pair of management interfaces comprising the steps of:

producing an information conversion function (ICF) by:
storing a model associated with each interface, each model comprising objects representing managed resources, providing a containment context for each object in a containment hierarchy,
classifying each object with a class defined by characteristics independent of the containment context, and
creating mappings between individual objects and between groups of objects having the same class and context from the stored models,
including run time conversion functions between equivalent parts of the models; and
producing a message communication function (MCF) associated with each management interface, each MCF comprising means for performing format conversion between the external protocol of the associated interfaces and an internal protocol for the ICF.

2. A process as claimed in claim 1, wherein the models are created at least partially automatically by loader modules.

3. A process as claimed in claim 1, wherein the models are created from management interface specifications, and specification free text is manually converted to the model language.

4. A process as claimed in claim 1, wherein the mappings define context class cardinality.

5. A process as claimed in claim 1, wherein mappings are created between context classes.

6. A process as claimed in claim 1, wherein mappings are created between objects.

7. A process as claimed in claim 1, wherein mappings are created between object characteristics.

8. A process as claimed in claim 7, wherein the object characteristics include object functions, relationships, attributes, notifications, and behavior.

9. A process as claimed in claim 1 wherein the mappings are created interactively using a graphical interface representing the models and the mappings.

10. A process as claimed in claim 1, wherein mappings are predicated by run time rules selected for the mappings.

11. A process as claimed in claim 1, wherein searches are carried out to determine if a proposed mapping has previously been made for similar characteristics and such mappings may be re-used.

12. A management interworking unit (MI) for at least two management interfaces comprising:

an information conversion function (ICF) comprising:
a model associated with each interface, each model comprising objects representing managed resources, each object having a containment context in a containment hierarchy, and each object being defined by a characteristic independent of the containment context, and
means for creating mappings between individual objects within groups of objects having the same class and context from stored models including mapping run time conversion functions between equivalent parts of the models; and
a message communication function (MCF) associated with each management interface, each MCF comprising means for performing format conversion between the external protocol of the associated interface and an internal protocol of the ICF.

13. A management interworking unit as claimed in claim 12, wherein the mappings define context class cardinality.

14. A management interworking unit as claimed in claim 12, wherein mappings means link context classes.

15. A management interworking unit as claimed in claim 12, wherein mappings means link objects.

16. A management interworking unit as claimed in claim 12, wherein mappings means link object characteristics.

17. A management interworking unit as claimed in claim 16, wherein the object characteristics include object functions or actions, relationships, attributes, notifications, and behavior.

18. A management interworking unit as claimed in claim 17, wherein mappings are predicated by run time rules selected for the mappings.

19. A management interworking unit as claimed in claim 17, wherein the internal protocol includes primitives controlling start, end, and rollback of atomic transactions in the ICF.

20. A process for producing a management interworking unit for a pair of management interfaces comprising the steps of:
producing an information conversion function (ICF) by:
storing a model associated with each interface, each model comprising objects representing managed resources;
providing a containment context for each object in a containment hierarchy;
classifying each object with a class defined by characteristics independent of the containment context;
creating mappings between individual objects and between groups of objects having the same class and context from the stored models, including ran time conversion functions between equivalent parts of the models;
pre-compiling the models and the mappings to a template to produce source code; and
modifying said template manually after pre-compiling where necessary; and
producing a message communication function (MCF) associated with each management interface, each MCF comprising means for performing format conversion between the external protocol of the associated interfaces and an internal protocol for the ICF.

21. A process as claimed in claim 20, wherein the models are created at least partially automatically by loader modules.

22. A process as claimed in claim 20, wherein the models are created from management interface specifications, and specification free text is manually converted to the model language.

23. A process as claimed in claim 20, wherein the mappings define context class cardinality.

24. A process as claimed in claim 20, wherein mappings are created between context classes.

25. A process as claimed in claim 20, wherein the mappings are created between objects.

26. A process as claimed in claim 20, wherein mappings are created between object characteristics.

27. A process as claimed in claim 26, wherein the object characteristics include object functions, relationships, attributes, notifications and behavior.

28. A process as claimed in claim 20, wherein the mappings are created interactively using a graphical interface representing the models and the mappings.

29. A process as claimed in claim 20, wherein mappings are predicted by run time rules selected for the mappings.

30. A process as claimed in claim 20, wherein searches are carried out to determine if a proposed mapping has previously been made for similar characteristics and such mappings may be reused.

31. A process as claimed in claim 20, wherein flags are inserted in the template to differentiate automatically generated code from manually generated code.

32. A management interworking unit (MIU) for at least two management interfaces comprising:
an information conversion function (ICF) comprising:
a model associated with each interface each model comprising objects representing managed resources, each object having a containment context in a containment hierarchy and each object being defined by a characteristic independent of the containment context,
means for creating mappings between individual objects within groups of objects having the same class and context from stored models including mapping run time conversion functions between equivalent parts of the models,
means for pre-compiling said model and said mappings to a template to produce source code, and
means for modifying said template after said pre-compiling means where necessary; and
a message communication function (MCF) associated with each management interface each MCF comprising means for performing format conversion between the external protocol of the associated interface and an internal protocol of the ICF.

33. A management interworking unit as claimed in claim 32, wherein the mappings means define context class cardinality.

34. A management interworking unit as claimed in claim 32, wherein the mappings means link context classes.

35. A management interworking unit as claimed in claim 32, wherein the mapping means link objects.

36. A management interworking unit as claimed in claim 32, wherein the mapping means link object characteristics.

37. A management interworking unit as claimed in claim 36, wherein the object characteristics include object functions or actions, relationships, attributes, notifications and behavior.

38. A management interworking unit as claimed in claim 32, wherein mappings are predicted by run time rules selected for the mappings.

39. A management interworking unit as claimed in claim 32, wherein the internal protocol include primitives controlling start, end and rollback of automatic transactions in the ICF.

40. A management interworking unit as claimed in claim 32, wherein there is provided means for inserting flags in the template to differentiate automatically generated code from manually generated code.

* * * * *